March 18, 1952 H. W. BAUMAN ET AL 2,589,660

MAGNETIC INSTRUMENT HIGH-SPEED REEL DRIVE

Filed Sept. 27, 1950

Harold W. Bauman
Melvin Sackter
INVENTORS
BY [signature] Attorneys

Patented Mar. 18, 1952 2,589,660

UNITED STATES PATENT OFFICE 2,589,660

MAGNETIC INSTRUMENT HIGH-SPEED REEL DRIVE

Harold W. Bauman, Chicago, and Melvin Sackter, Arlington Heights, Ill., assignors to Ampro Corporation, Chicago, Ill., a corporation of Illinois Application September 27, 1950, Serial No. 187,076

6 Claims. (Cl. 242—55)

The present invention relates to drive systems for the takeup reels of magnetic recording and/or reproducing instruments, such as one wherein an elongate record body is advanced past a recording or reproducing magnetic head by a constant speed drive device, the record body being stripped from a supply reel for feed, to the head and wound on a takeup reel after passing the head. It is desirable to make provision in such instruments for winding record bodies at a speed that is high as compared to the speed at which they are advanced by the constant speed drive used in recording or reproduction, for quick rewind or for high speed advance to quickly reach a desired point of a record body. In the prior art it has become quite common practice to provide mechanism for advancing the record body past a recording and/or pickup head at a rate that is maintained constant during recording or reproduction, and for takeup of such body by a reel driven from the same constant speed motor that powers the record drive. In such prior art arrangements the surface speed of the progressively enlarged takeup reel coil has been maintained in correspondence to the constant travel rate of the record body, by driving the takeup reel through a friction slip clutch from a drive shaft rotating at a constant speed sufficiently high to maintain the record body taut at the minimum diameter of takeup coil. In this type of operation the speed of the driven clutch element and reel is limited by tension of the record body between the reel and the constant speed device that advances the record, slip being provided between the driving and driven friction clutch elements to accommodate reel speed to a coil surface speed matching the record speed. In the prior art it has also been the practice for high speed winding purposes to provide a rewind high speed drive train to the supply reel spindle that can be established and interrupted at will, and in correlation with interruption and establishment of the takeup reel drive.

For low cost magnetic instruments it is desirable to eliminate so far as possible all elements that are not absolutely necessary to proper instrument operation. Elimination of a high speed drive train and substitution of a very simple and inexpensive, but highly effective high speed drive to the takeup spindle which is useful for both high speed winding purposes and normal takeup drive is the subject of the present invention. In brief the invention resides in making provision for rotating the driver element of a takeup slip clutch at a speed sufficiently high for satisfactory high speed winding when the takeup reel is rotated in one-to-one ratio to such spindle, and providing means for selectively establishing a positive drive from such driver element to a reel mounted in normal takeup condition on the takeup reel spindle. By placing an empty reel on the takeup spindle and establishing the positive drive from the driver slip clutch element to such reel, the latter may be driven at high speed to wind thereon a record body stripped from a reel mounted on the spindle that normally supports the supply reel.

The primary object of the invention is provision of a novel system for selectively driving the takeup reel of a magnetic recording and/or reproducing instrument either positively at a high speed, or through a slip clutch for driving it in a low speed range suited to takeup during reproduction or recording.

Another object is the provision in a magnetic recording and/or reproducing instrument, having a takeup reel drive that includes a slip clutch with a driver element rotatable at constant speed and a driven element rotatable at a variable speed determined by the travel rate of a record body and the radius of a coil of such body on a reel coupled to the driven element, of a novel element for establishing a high speed positive drive from the driver clutch element to such a reel.

Figure 1:
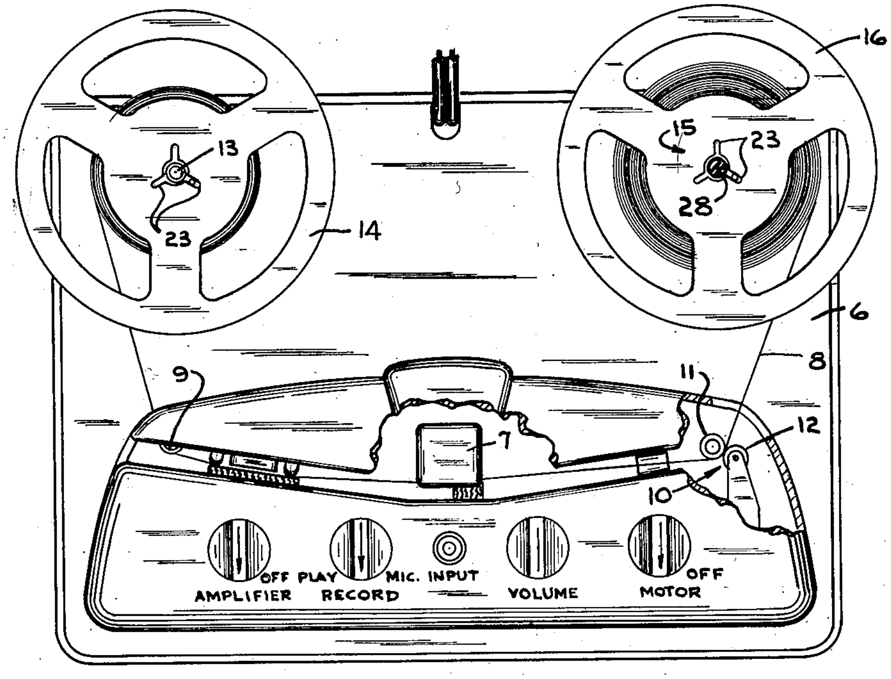
Fig. 1 is a partially broken top plan of a magnetic recording and/or reproducing instrument embodying the invention.

Describing the drawings in detail, the instrument shown in Fig. 1 includes a casing having a top or cover plate 6 on which is mounted a magnetic recording and reproducing head 7 for cooperation with a flexible elongate record body 8 of magnetic material as the latter travels past it in a predetermined record path. Guide means determining the record body path include a record body-contacting surface of head 7, an entrance guide pin 9 and a drive assembly 10 including a capstan roll 11, driven at a constant speed by motor actuated mechanism housed in the casing. A pinch roll 12 is biased to resiliently press a record body against roll 11 for drive of such body by roll 11. The instrument comprises a spindle 13 for supporting a supply reel 14 from which the record body is stripped as it is drawn past the head. A takeup spindle assembly 15 is arranged to rotate a takeup reel 16 to wind the record body on the latter as it is ejected from the drive assembly 10. Assembly 15 forms the subject of this invention.

Figure 4:
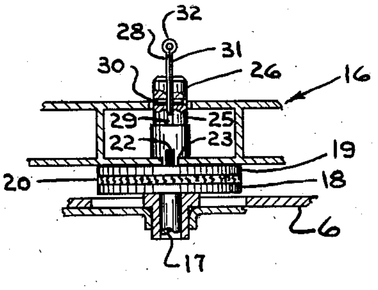
Fig. 4 is a vertical section on line 4—4 of Fig. 3.

Referring to Fig. 4, the spindle 17, which comprises the power input to takeup assembly 15, projects through cover plate 6 and is rotated, by suitable mechanism in the casing, from the same constant speed motor that rotates capstan roll 11. Assembly 15 includes a friction clutch comprising a driver plate 18 that is secured to and rotatable with spindle 17, and a driven plate 19 that rotatably surrounds the spindle in driven relation to plate 18, as through an intermediate friction plate 20, of such material as oil impregnated felt. Projecting from the upper or outer surface 21 of driven plate 19 is a stud 22 for entering a radial slot 23 with which commercially produced record body reels, as 14 and 15, are provided, usually in multiple. Such slots are provided in both sides of the reel bodies to permit the reel to be engaged with drive pins such as 22 in reversed positions of the reels, since many tape recording instruments are arranged to record on two tracks respectively adjacent the opposite edges of the tape record bodies.

For purposes of the invention the speed at which spindle 17 is rotated is assumed to be sufficiently high to provide satisfactory high speed drive of a reel rotated in one-to-one ratio with the spindle, and in accordance with the invention a clutch arrangement is provided for selectively positively coupling to the assembly of spindle 17 and driver plate 18 a reel that is mounted on spindle 17, supported by plate 19 and with pin 22 engaged in one of its slots 23, that is to say, mounted in the normal takeup reel driveway. This clutch arrangement is mounted in portions 25, 26 of spindle 17 that axially are extended beyond driven friction plate 19 and that are disposed respectively to lie inside the hub structure of a reel 16 mounted on the spindle, and to project beyond such a reel.

Figures 2, 3:
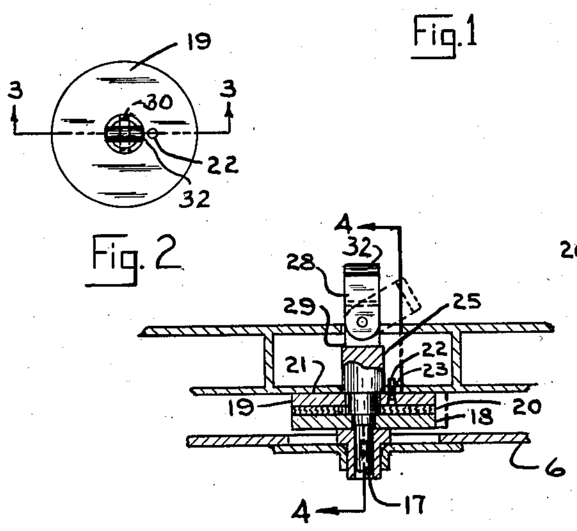
Fig. 2 is a top plan of a takeup reel-driving assembly arranged in accordance with the invention.
Fig. 3 is a vertical transverse section on line 3—3 of Fig. 2.

The clutch arrangement comprises an element so mounted in these spindle parts as to be manually movable between a retracted or non-engaging position within the boundary surfaces of the spindle parts and an advanced position projecting from the spindle parts into positive engagement with a reel mounted on the assembly. The arrangement shown in the drawings for selectively clutching the reel 16 to the spindle, comprises a flat element 28 that is mounted in a transverse slot 29 extended axially through portion 26 and into portion 25 of the spindle. Element 28 is of a width no greater than the diameter of the spindle and is pivoted to the spindle by a pin 30 so located axially of the spindle with respect to the length of element 28 that the latter may be swung between an extended angular position, shown in dotted lines in Fig. 3, engaged in one of the reel slots 23, and a retracted position wherein it lies in slot 29 and is housed within the spindle structure. When in its retracted position element 28 preferably projects beyond the end of the spindle structure for ready access for manual movement between its two positions.

Preferably, to prevent unintended movement, the clutch element 28 is so mounted and arranged that its movement in slot 29 is resisted, as by an indexing bias or by friction. To this end element 28 is shown as comprising a rebent plate the two side-by-side reaches 31 of which are connected by a rolled-over part 32, which serves to bias the plate apart and into frictional contact with the surfaces of the spindle defining the sides of slot 29. The rolled-over part 32 serves as a convenient element for manual grasping in movement of the clutch device 28.

It will be seen that positive clutching of a reel to the takeup spindle that drives a reel through a friction clutch for normal takeup, provides an efficient high speed wind for magnetic instruments, without complex and expensive dual drives. The specific clutch herein disclosed provides a very inexpensive, readily operated and wholly satisfactory device for practising the invention.

It will be evident that a great many changes may be resorted to without departing from the invention as defined by the claims.

We claim:

1. In a magnetic recording and/or reproducing instrument provided with means for advancing an elongate record body at a constant rate past a head, and a takeup reel drive mechanism including a slip clutch having a driven element for driving engagement with a takeup reel, a driver element and means for rotating said driver element at a constant speed; means for selectively driving at the speed of the driver element a reel engaged by said driven element, comprising positive clutch means actuable to positively lock said driver clutch element to such a reel against relative rotational movement in either direction.

2. A reel-driving slip clutch assembly for a magnetic recording and/or reproducing instrument; comprising a takeup reel-supporting spindle, a driver friction clutch element secured to said spindle, a driven friction clutch element rotatably mounted on said spindle in cooperative relation to said driver element and arranged for cooperating with a reel dismountably mounted on said spindle, and clutch means rotatable with said driver element movable between engaging and withdrawn positions wherein respectively it is effective and ineffective to lock a reel to said driver element, and said clutch means including an actuator manually movable between two positions wherein respectively it is effective to maintain said clutch means in the different ones of its said positions.

3. A reel-driving clutch assembly for a magnetic recording and/or reproducing instrument, comprising a driver friction clutch element, a reel-supporting spindle rotatable with said element, a driven friction element surrounding said spindle in relatively rotatable relation to it, said driven element being arranged for slip-clutch cooperation with said driver element and for driving engagement with a reel supported on said spindle, and a locking clutch element mounted on said spindle for movement between extended and retracted positions respectively keying such a reel to said spindle for positive drive and releasing it for drive through said driven clutch element.

4. A reel-driving clutch assembly for a magnetic recording and/or reproducing instrument, comprising a spindle for power driven rotation, a driver friction clutch plate rotatable with said spindle, a driven friction clutch plate rotatably surrounding said spindle in frictional driven relation to said driver plate and arranged for driving connection with a reel demountably supported on the spindle, said spindle having a portion extended axially beyond said clutch plate to project through a reel supported on said spindle in driven engagement with said driven clutch plate, and a positive reel-engaging clutching device mounted in said extended spindle portion for movement between reel-engaging and releasing positions, said device having a manually operable actuator disposed for access when a reel is mounted on said spindle.

5. A reel-driving clutch assembly for a magnetic recording and/or reproducing instrument, comprising a spindle for power driven rotation, a driver friction clutch plate rotatable with said spindle, a driven friction clutch plate rotatably surrounding said spindle in frictional driven relation to said driver plate and arranged for driving connection with a reel demountably supported on the spindle, said spindle having a portion extended axially beyond the driven plate to project through a reel supported on said spindle in driven contact with said driven clutch plate, and a positive reel-engaging clutching device comprising a clutch element movably mounted in said spindle for movement between a retracted position wholly within the bounds of the spindle and an extended position projecting from the spindle for positive engagement with a reel mounted on the spindle in driven engagement with said driven clutch plate.

6. A reel-driving clutch assembly for a magnetic recording and/or reproducing instrument, comprising a spindle for power driven rotation, a driver friction clutch plate mounted on and rotatable with said spindle, a driven friction clutch plate rotatably surrounding said spindle in frictional driven relation to said driver plate and arranged for driving connection with a reel demountably supported on the spindle, said spindle having portions extended axially beyond said driven plate to respectively lie within and project beyond the structure of a reel supported on said spindle in driven engagement with said driven clutch plate, and a positive reel-engaging clutching device comprising an element disposed in an axial slot in said spindle portions, pivotally secured to the spindle and extended beyond the second said portion for swinging from a retracted position housed within the bounds of the spindle to an advanced position angularly extended from the spindle for engagement with a reel so supported thereon.

HAROLD W. BAUMAN.
MELVIN SACKTER.

REFERENCES CITED

The following references are of record in the file of this patent:

UNITED STATES PATENTS

| Number | Name | Date |
|---|---|---|
| 873,071 | Mixon | Dec. 10, 1907 |
| 2,048,382 | Holden | July 21, 1936 |
| 2,343,961 | Del Valle | Mar. 14, 1944 |
| 2,555,671 | Baia | June 5, 1951 |